United States Patent [19]

Erbach

[11] 4,269,143

[45] May 26, 1981

[54] TEAT CUP ASSEMBLY

[75] Inventor: Thomas W. Erbach, Madison, Wis.

[73] Assignee: DEC International, Inc., Madison, Wis.

[21] Appl. No.: 103,851

[22] Filed: Dec. 14, 1979

Related U.S. Application Data

[63] Continuation of Ser. No. 833,748, Sep. 16, 1977, abandoned.

[51] Int. Cl.³ .................................................. A01J 5/06
[52] U.S. Cl. .................................................... 119/14.49
[58] Field of Search ............... 119/14.36, 14.47, 14.48, 119/14.49, 14.5, 14.51, 14.52

[56] References Cited

U.S. PATENT DOCUMENTS 3,818,867  6/1974  Strange-Hansen ................ 119/14.47

FOREIGN PATENT DOCUMENTS 253060  7/1964  Australia ............................... 119/14.48
83232   7/1957  Denmark .............................. 119/14.47
610213 10/1948 United Kingdom .................. 119/14.49
919563  2/1963 United Kingdom .................. 119/14.48

Primary Examiner—Gene Mancene
Assistant Examiner—Robert P. Swiatek
Attorney, Agent, or Firm—Michael, Best & Friedrich

[57] ABSTRACT

A teat cup assembly including a central shell member of transparent plastic material and an upper shell member of stainless steel telescopically engaged with the central shell member. A stop is provided for limiting the telescopic engagement of the upper shell with respect to the central shell. An inflation member is mounted inside the central and upper shells with the cap portion of the inflation fitted over the upper edge of the upper shell and with the lower end portion of the inflation stretched over the lower end of the central shell. A cap member of transparent plastic material is threaded onto the lower end of the central shell to securely capture the folded over portion of the inflation.

1 Claim, 3 Drawing Figures

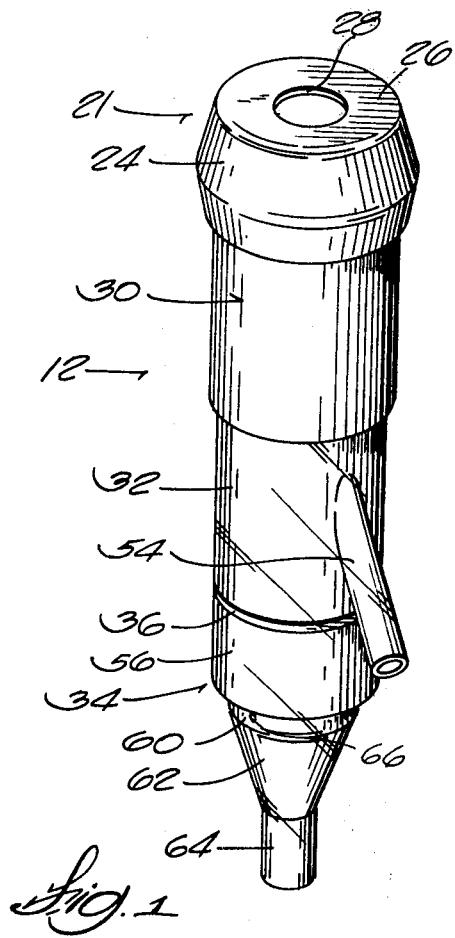
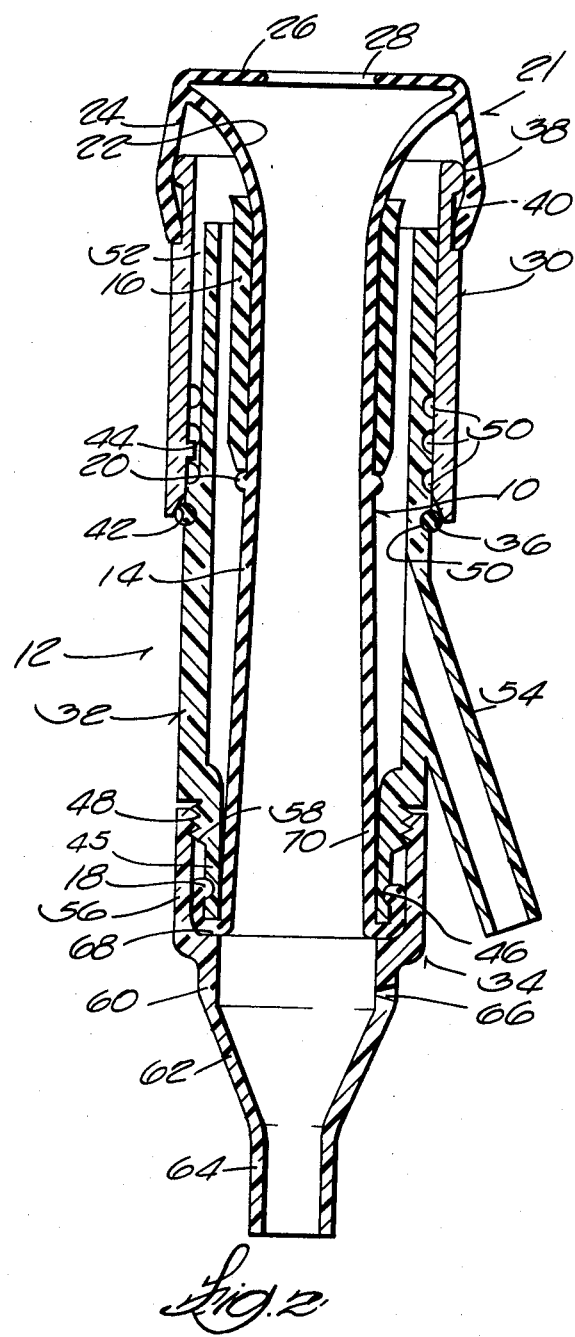

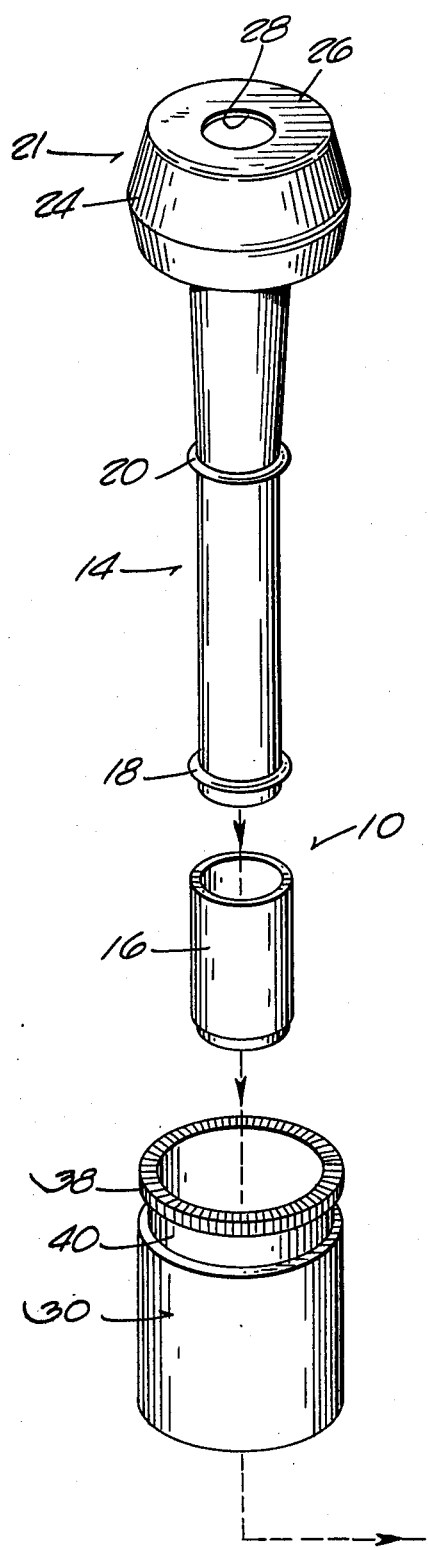
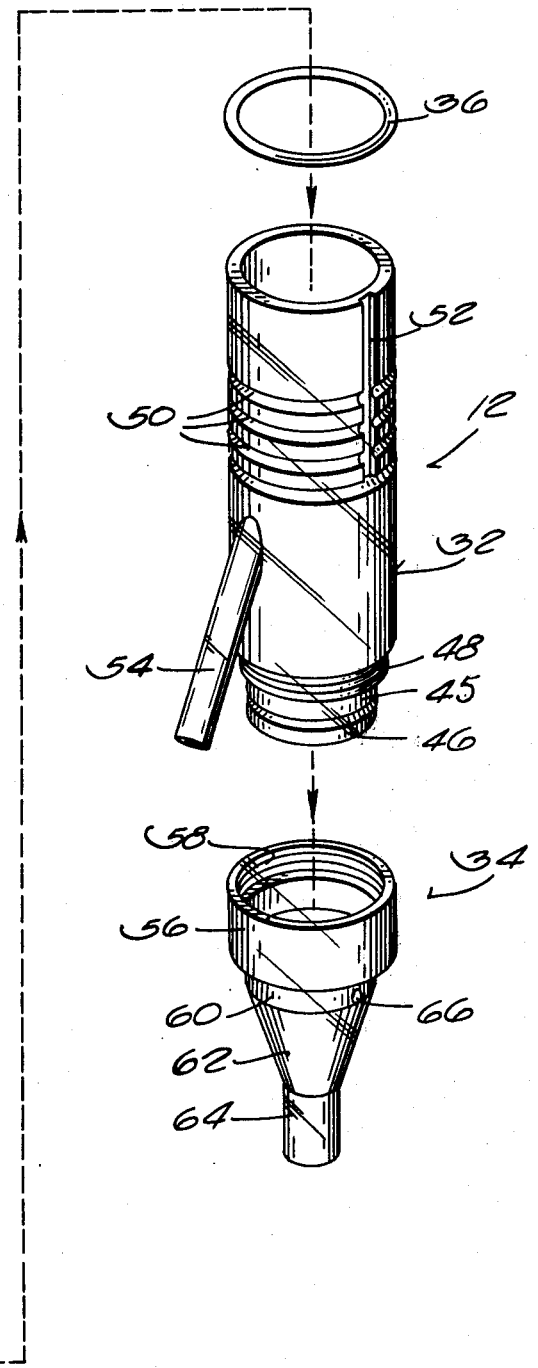
Fig. 3

TEAT CUP ASSEMBLY

CROSS REFERENCE TO RELATED APPLICATION

This is a continuation of application Ser. No. 833,748 filed Sept. 16, 1977 and now abandoned.

BACKGROUND OF THE INVENTION

I. Field of the Invention

This invention relates to a teat cup assembly for use with a milking machine.

II. Description of the Prior Art

Most of prior teat cup assemblies known to applicant require some kind of special tool to assemble the parts when replacement of the inflation becomes necessary. The teat cup assembly of the present invention can be readily assembled without the use of special tools. The assembly also provides a smooth unobstructed flow path for the milk to pass therethrough to thus reduce any tendency of milk to flow back into the cow's teat. Such flow path also makes the unit readily adaptable for the use of cleaning-inplace sanitation procedures.

SUMMARY OF THE INVENTION

A teat cup assembly comprising a central shell member having a vacuum line tube connector and an upper shell member mounted on the top portion of the central shell member in telescopic engagement therewith. An adjustable stop means is provided for limiting the telescopic engagement of the upper shell with the central shell. An inflation member is mounted inside the telescopically arranged central and upper shells with the cap portion of the inflation fitted over the upper end of the upper shell and with the lower end of the inflation stretched over the lower end of the central shell. A threaded cap member is removably mounted on the lower end of the central shell which when screwed on tightly serves to seal the lower end of the inflation to the shell and cap members.

DESCRIPTION OF THE DRAWINGS

FIG. 1 is a perspective view of the teat cup assembly of the present invention;

FIG. 2 is a sectional view of the teat cup assembly; and

FIG. 3. is an exploded perspective view of the teat cup assembly.

DESCRIPTION OF THE PREFERRED EMBODIMENT

Referring now to the drawings in detail, the teat cup assembly of the present invention is comprised of two basic assemblies, namely, an inflation assembly 10 and a shell assembly 12 in which the inflation assembly 10 is mounted.

Inflation assembly 10 is comprised of an elongated tubular body member 14 and a reinforcing jacket member 16 mounted on the upper portion of the body member 14 as shown in FIG. 2. The lower end of member 14 has a retaining rib 18 formed on the external surface thereof, the function of which will be explained in detail hereinafter. A second retaining rib 20 is formed on the outer surface of body member 14 at the central portion thereof. Rib 20 serves to retain jacket member 16 at the desired position on body member 14 as shown in FIG. 2.

The upper cap portion 21 of body member 14 is flared outwardly as indicated by reference numeral 22. A retaining skirt portion 24 depends from the upper end of flared portion 22 and a horizontal wall portion 26 having a circular teat receiving opening 28 therein extends across the top of skirt 24. Body member 14 and jacket member 16 are preferably made from a resilient material such as rubber.

Referring now to shell assembly 12, such assembly is comprised of an upper shell member 30, a central shell member 32, an end cap member 34 and a positioning ring member 36.

Upper shell member 30 is of cylindrical shape and has a knurled lip 38 at the upper end thereof and a retaining groove 40 adjacent the lip 38. The inner surface of member 30 is chamfered at its lower end as indicated by reference numeral 42 as shown in FIG. 2. Also, as shown in FIG. 2, an upstanding lug 44 is formed on the inside surface of member 30, the function of which will be described hereinafter.

Central shell member 32 is of cylindrical shape and has a lower end portion 45 of reduced diameter which in turn has a retaining groove 46 and a threaded portion 48 on the outside surface thereof. Member 32 also has a plurality of axially spaced grooves 50 and a longitudinally extending keyway 52 which extends from the grooves 50 to the upper end of member 32 as clearly shown in FIGS. 2 and 3. Member 32 is also provided with a vacuum line connector tube 54 which communicates with the interior of the member 32 and is formed integrally therewith.

End cap member 34 is comprised of a cylindrical body portion 56 having an internal threaded portion 58, a second cylindrical portion 60 of reduced diameter, a funnel-shaped portion 62 and a connector tip 64 for connection to a milk line (not shown). Member 34 is provided with a vent hole 66 located in portion 60.

In the preferred embodiment members 32 and 34 are made of a hard, smooth transparent plastic material such as polysulphone. Member 30 is made of metal, preferably stainless steel, and ring member 36 is made of a resilient material such as synthetic rubber. The relatively thick-walled metal member 36 provides the weight necessary for proper action of the teat cup assembly in the milking process.

In use, parts of the teat cup assembly of the present invention are assembled by proceeding as follows. Inflation jacket 16 is assembled on inflation body member 14 sliding it over the lower end of body member 14 and then moving it upwardly to the position shown in FIG. 2 wherein the lower end of the jacket 16 engages retaining rib 20 on inflation body 14. As so assembled, jacket 16 serves to reinforce the upper portion of the inflation body member 14 which is the portion which receives the teat of the cow during milking.

The next step is to assemble inflation 10 and upper shell member 30. This is accomplished by inserting inflation 10 through the top of member 30 and then expanding skirt 24 of the inflation manually so that it will fit over knurled edge 38 and become seated in groove 40 as shown in FIG. 2. Knurled edge 38 resists any tendency of the inflation to rotate with respect to upper shell member 30.

Next, the previously assembled inflation 10 and shell member 30 is assembled with central shell member 32. This is accomplished by first positioning ring 36 in the proper groove 50. When the inflation 10 is new, ring 36 is positioned in the lowermost groove 50 as shown in FIG. 2. Parts are assembled by aligning lug 44 on member 30 with keyway 52 in member 32 and then sliding member 30 over the upper portion of member 32 until chamfered surface 42 at the bottom edge of member 30 seats against ring 36. Next, the lower end of inflation body 14 is stretched through the end of body member 32 and is then folded back over such end with the rib 18 seated in the groove 46 to thereby retain the inflation securely in place inside member 32. The combination of keyway 52 in member 32 with lug 44 on member 30 prevents relative rotation of members 32 and 30. The chamfered edge 42 on member 30 serves to force ring 36 into groove 50 to thus securely seat the ring in the groove. Ring 36 in groove 50 thus serves as a stop means to limit the extent of the telescopic engagement of shell member 30 on shell member 32.

The final step of assembly is the installation of cap member 34 on the end of shell member 32. This is accomplished by simply screwing the two parts together by means of mating threaded portions 48 and 58 on the body and cap respectively. As cap 34 is tightened up snugly on body 32, the internal shoulder 68 on cap 34 will bear against the folded over portion of inflation body 14 to thereby seal the parts at the joint between the cap 34 and the shell 32. It will be noted that the parts are dimensioned so that the lower portion of inflation body becomes flared outwardly as at 70 when assembled in shell member 32 as clearly shown in FIG. 2.

The assembled teat cup is now ready for use in milking by connection to a milking unit of any suitable design. It will be appreciated that as its use in milking continues, the inherent resiliency of inflation body 14 will gradually diminish, resulting in a lessening of end-to-end tension in body 14. This gradual lessening of tension in body 14 can be compensated for by adjusting the overall length of the inflation 10-body 32-body 30 assembly. This is accomplished by simply sliding body member 30 up on body 32 until the next higher groove 50 is exposed and then moving ring 36 upwardly until it seats in such groove. This adjustment procedure can be repeated over the life of the inflation. The result is that the life span of the inflation is substantially increased without losing its effectiveness over such life span. The inflation must, of course, be replaced periodically. With proper use, the other parts of the assembly will last almost indefinitely.

It will be appreciated from the foregoing that the teat cup assembly of the present invention is comprised of a relatively few and relatively inexpensive parts which can be readily assembled without the need of special tools or jigs. It is also important to note that once assembled, the interior of the unit through which milk flows is smooth and unobstructed, making the unit readily adapted for cleaning in place procedures, a feature which is of great importance in the dairy industry.

Another related feature is that because the milk flow path through the unit is free and unobstructed, the milk coming from the cow will be readily carried away from the unit through the milk line, thus substantially eliminating any possibility of milk backing up into the cow's teat. More specifically, this is accomplished by the outwardly flaring configuration 70 of the lower portion of inflation body 14 from which the milk empties into the funnel portion 62 of cap 34 to thus prevent any tendency of milk to build up near the end of the cow's teat. The vent 66 serves to partially break the vacuum in the cap to thus further aid the rapid flow of milk out of the unit.

Making control shell member 32 and end cap member 34 of transparent plastic material provides important advantages. Milk flow from the cow can be observed through cap 34 so that the milk flow from each teat during milking can be visually monitored. The transparency of shell member 32 facilitates visual detection of leakage of milk into shell 32 during milking or leakage of cleaning water into shell 32 during cleaning.

I claim:
1. A teat cup assembly comprising:
   a central shell member of substantially cylindrical shape made of a transparent plastic material and having a vacuum line connector tube connected thereto;
   an upper shell member of substantially cylindrical shape mounted on the top portion of said central shell member in telescopic engagement therewith, said upper shell member having a chamfered portion on the lower edge thereof and a knurled lip on the upper end thereof;
   stop means for limiting the telescopic engagement of said upper shell member with respect to said central shell member, said stop means being adjustable so that the overall length of said telescopically engaged central and upper shell members can be adjusted, said adjustable stop means being comprised of a plurality of axially spaced circular grooves in the outer surface of said central shell member and further includes a stop ring member adapted for engagement with one of said grooves and with the lower edge of said upper shell member;
   an inflation member of resilient material mounted inside said upper and central shell members, said inflation member having an upper cap portion fitted over the upper end of said upper shell member and a lower end portion stretched over and folded back over the lower end of said central shell member, said cap portion of said inflation member having a teat receiving opening therein, said inflation member further being flared outwardly at the lower end thereof; and
   a cap member threadably mounted on the lower end of said central shell member, said cap member made of a transparent plastic material and having a shoulder formed thereon which is positioned to move into engagement with said folded over lower end portion of said inflation member when said cap is threaded onto said central shell member, said cap member further having a connector tip in the lower end thereof for connection to a milk line, a vent hole in the wall thereof and a funnel-shaped portion through which milk flows to said connector tip.

* * * * *